(12) United States Patent
Hu et al.

(10) Patent No.: US 9,369,780 B2
(45) Date of Patent: Jun. 14, 2016

(54) METHODS AND SYSTEMS FOR DETECTING ONE OR MORE ADVERTISEMENT BREAKS IN A MEDIA CONTENT STREAM

(71) Applicant: Verizon Patent and Licensing Inc., Arlington, VA (US)

(72) Inventors: Si Ying Diana Hu, Sunnyvale, CA (US); Eduardo Jimenez, Santa Clara, CA (US); Joaquin A. Delgado, Fremont, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/448,984

(22) Filed: Jul. 31, 2014

(65) Prior Publication Data
US 2016/0037232 A1 Feb. 4, 2016

(51) Int. Cl.
*H04N 7/16* (2011.01)
*H04N 21/81* (2011.01)
*H04N 21/435* (2011.01)
*H04N 21/6587* (2011.01)
*H04N 21/462* (2011.01)

(52) U.S. Cl.
CPC ........... *H04N 21/812* (2013.01); *H04N 21/435* (2013.01); *H04N 21/462* (2013.01); *H04N 21/6587* (2013.01)

(58) Field of Classification Search
None
See application file for complete search history.

(56) References Cited

U.S. PATENT DOCUMENTS

| | | | | |
|---|---|---|---|---|
| 5,436,653 A * | 7/1995 | Ellis | ................... | G06K 9/00711 725/19 |
| 6,792,135 B1 * | 9/2004 | Toyama | ............. | G06K 9/00228 382/118 |
| 7,058,376 B2 * | 6/2006 | Logan | ................... | H04H 20/28 348/E5.108 |
| 7,269,330 B1 * | 9/2007 | Iggulden | .............. | H04H 60/375 348/460 |
| 2003/0126598 A1 * | 7/2003 | Agnihotri | ......... | G06F 17/30787 725/32 |
| 2004/0062520 A1 * | 4/2004 | Gutta | ................... | G11B 27/034 386/249 |
| 2004/0181799 A1 * | 9/2004 | Lu | .......................... | H04H 60/56 725/18 |
| 2006/0153296 A1 * | 7/2006 | Deng | ................. | G06F 17/30799 375/240.12 |
| 2006/0184961 A1 * | 8/2006 | Lee | .................... | G06Q 20/1235 725/32 |
| 2006/0195861 A1 * | 8/2006 | Lee | ..................... | G06K 9/00523 725/19 |
| 2007/0192782 A1 * | 8/2007 | Ramaswamy | ......... | H04H 60/37 725/9 |
| 2007/0294729 A1 * | 12/2007 | Ramaswamy | ......... | H04H 60/58 725/53 |
| 2008/0148307 A1 * | 6/2008 | Nielsen | .................. | H04H 60/32 725/9 |
| 2010/0114527 A1 * | 5/2010 | Lee | ........................ | H04H 60/32 702/181 |
| 2010/0115542 A1 * | 5/2010 | Lee | ...................... | G06K 9/0053 725/19 |
| 2013/0057761 A1 * | 3/2013 | Bloom | ..................... | H04N 5/04 348/515 |
| 2014/0201787 A1 * | 7/2014 | Neumeier | .......... | H04N 5/44591 725/34 |
| 2015/0128290 A1 * | 5/2015 | De Ayala | ................. | H04N 5/76 726/28 |
| 2015/0229979 A1 * | 8/2015 | Wood | ................. | H04N 21/2668 725/14 |
| 2015/0229980 A1 * | 8/2015 | Reisner | ............ | H04N 21/26233 725/32 |

FOREIGN PATENT DOCUMENTS

IL    WO 2013164817 A1 * 11/2013 ............. H04H 20/14

* cited by examiner

*Primary Examiner* — Fernando Alcon

(57) ABSTRACT

An exemplary method includes a media content management system receiving a media content stream, independently processing the media content stream in accordance with a multi-stage feature detection heuristic and in accordance with a signature matching heuristic, and classifying, based on the independent processing, a media content block included in the media content stream as including an advertisement break. Corresponding systems and methods are also described.

20 Claims, 9 Drawing Sheets

US 9,369,780 B2

METHODS AND SYSTEMS FOR DETECTING ONE OR MORE ADVERTISEMENT BREAKS IN A MEDIA CONTENT STREAM

BACKGROUND INFORMATION

Traditional digital video recording ("DVR") devices, such as set-top box devices located in subscribers' homes, include hard drives or the like within which recorded media content may be stored for subsequent playback. Unfortunately, a DVR device's hard drive may run out of available storage space after a certain amount of recorded media content data is stored therein. Moreover, with the ever-increasing amount of available media content programming, a user may easily miss recording media programs in which the user may be interested.

Various types of cloud-based DVR services have been developed to address these limitations of traditional DVR devices. For example, a network DVR service may provide virtually unlimited storage capabilities for users of the network DVR service by remotely recording and storing copies of media content (e.g., within one or more network-based servers maintained by a provider of the network DVR service) in response to requests by users to record the media content. The network DVR service may subsequently receive a request provided by a user to play back the recorded media content by way of a local computing device (e.g., a set-top box device, a mobile computing device, etc.), and, in response, provide (e.g., stream) one of the copies of the media content to the local computing device in order to facilitate playback of the recorded media content by the local computing device.

As another example, a "catch up" television service may automatically record all television programming broadcast by way of one or more television channels (e.g., within one or more network-based servers maintained by a provider of the catch up television service). The television programming may be available for subsequent network access by users of the catch up television service for a predetermined number of days (e.g., a week) after it is recorded. In this manner, users do not have to manually select television programs that they would like to record.

The viability of these and other cloud-based DVR services depends on the ability of cloud-based DVR service providers to accurately and efficiently detect advertisement breaks (and, in some cases, specific advertisements included in the advertisement breaks) within media content recorded by the cloud-based DVR services. This is because providers of the media content may require the cloud-based DVR services to apply specific playback policies to the advertisement breaks (e.g., by not allowing users to fast forward through the advertisement breaks during playback of the media content) before allowing the cloud-based DVR services to record the media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
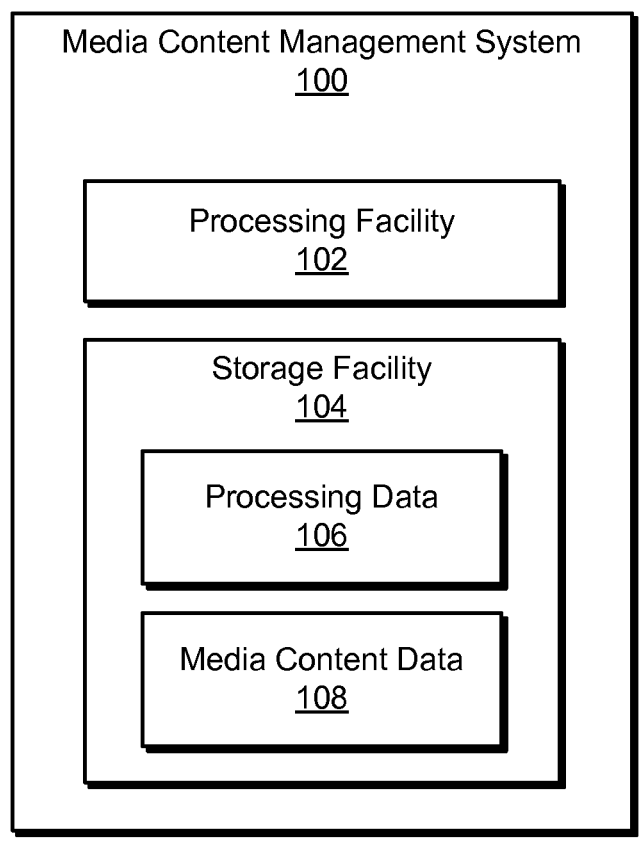
FIG. 1 illustrates an exemplary media content management system according to principles described herein.

Methods and systems for detecting one or more advertisement breaks in a media content stream are described herein. As will be described below, a media content management system may receive a media content stream and, while the media content stream is being received, independently process the media content stream in accordance with a multi-stage feature detection heuristic and in accordance with a signature matching heuristic. Based on the independent processing of the media content stream in accordance with both the multi-stage feature detection heuristic and the signature matching heuristic, the media content management system may classify a media content block included in the media content stream as including an advertisement break.

For example, the media content management system may independently process an incoming media content stream in two parallel processing branches. In the first processing branch, the media content management system may process the incoming media content stream in accordance with a multi-stage feature detection heuristic by identifying one or more features within the media content stream that are potentially indicative of one or more advertisement breaks within the media content stream and generating, based on the identifying, a first set of probability scores for a first set of segments of the media content stream. Each probability score included in the first set of probability scores indicates a probability that a corresponding segment included in the first set of segments includes advertisement content.

In the second processing branch, the media content management system may independently process the incoming media content stream in accordance with a signature matching heuristic by dividing the media content stream into a second set of segments, generating a plurality of signatures each corresponding to a segment included in the second set of segments, determining whether each signature included in the plurality of signatures matches an advertisement included in a database of known advertisements, and generating, based on the determining, a second set of probability scores for the second set of segments. Each probability score included in the second set of probability scores indicates a probability that a corresponding segment included in the second set of segments includes advertisement content.

A classifier included in the media content management system may receive the first and second sets of probability scores output by the parallel processing branches, and use one or more probability scores included in each set of probability scores to classify a media content block as including or not including an advertisement break (i.e., at least a portion of an advertisement break). This will be described in more detail below. Once a media content block has been classified as including an advertisement break, the media content management system may enforce one or more playback policies associated with the advertisement break while the media content block is being played back by a media content processing device (e.g., a set-top box device).

By processing a media content stream in accordance with both a multi-stage feature detection heuristic and a signature matching heuristic, the systems and methods described herein may more accurately and efficiently detect advertisement breaks included in the media content stream compared to conventional advertisement break detection schemes. Hence, the systems and methods described herein may be used to concurrently process media content streams concurrently received by way of hundreds or even thousands of media content channels and identify, in near real-time, the advertisement breaks included in each of the media content streams. This may facilitate cloud-based DVR services, such as catch up television and/or network DVR services.

Moreover, because the processing branches described herein are performed in parallel, the systems and methods described herein are easily scalable. For example, each step included in the processing branches described herein may be executed by any available machine subscribed to a given processing branch via cloud-based application programming interfaces ("APIs"). Because of this, each processing branch may be scaled by adding more nodes, which will automatically add capacity to each processing branch. Moreover, the processing logic itself may migrate across any machine, ensuring that there are no single points of failure.

Figure 2:
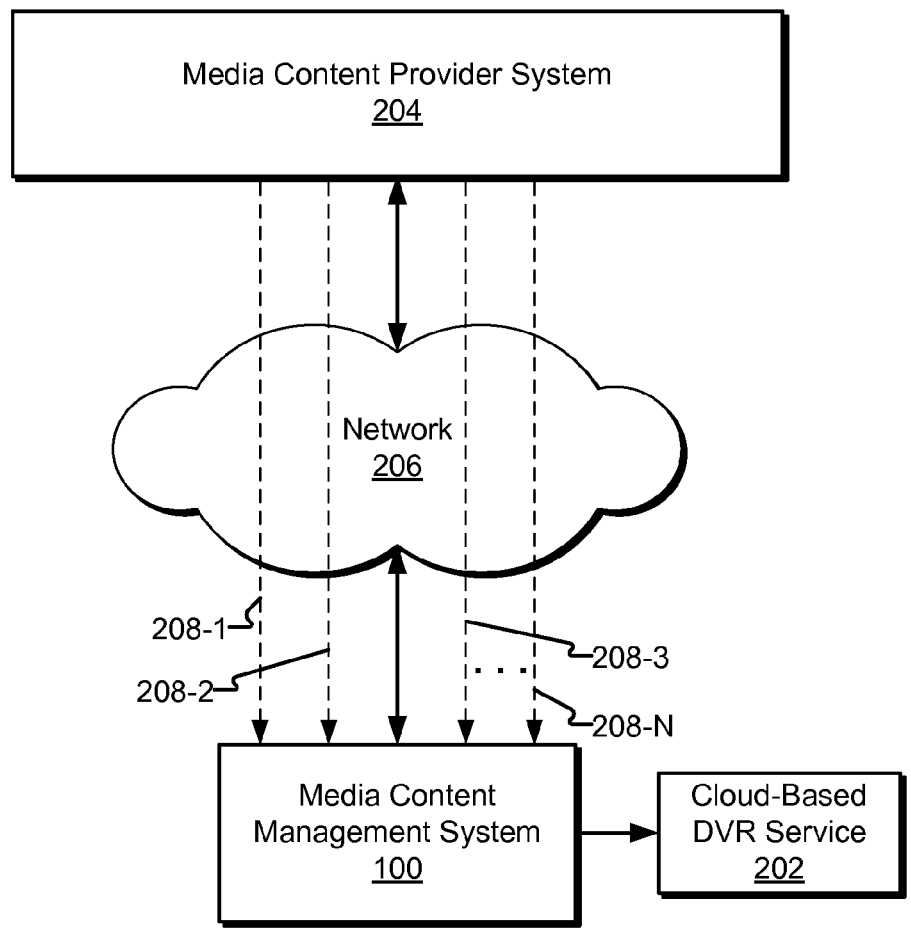
FIG. 2 shows an exemplary configuration in which the system of FIG. 1 provides a cloud-based DVR service according to principles described herein.

FIG. 1 illustrates an exemplary media content management system 100 ("system 100"). In some examples, system 100 may be associated with (e.g., provided and/or maintained by) a provider of a cloud-based DVR service. For example, FIG. 2 shows an exemplary configuration 200 in which system 100 provides a cloud-based DVR service 202, which may include any of the cloud-based DVR services described herein. To this end, as shown in FIG. 2, system 100 may be communicatively coupled to a media content provider system 204 by way of a network 206.

Network 206 may include one or more networks, such as one or more cable networks, subscriber television networks, wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and/or any other network(s) capable of carrying data and/or communications signals between media content provider system 204 and system 100.

System 100 and media content provider system 204 may communicate using any communication platforms and technologies suitable for transporting data (e.g., media content streams) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

Media content provider system 204 may be associated with a service provider (e.g., a subscriber television service provider, an Internet service provider, etc.), a media content program provider (e.g., ESPN, NBC, etc.), and/or any other type of media content provider. Accordingly, media content provider system 204 may be configured to provide one or more media content services (e.g., television services, video-on-demand services, Internet services, application services, etc.). For example, media content provider system 204 may be configured to manage (e.g., maintain, process, distribute, and/or generate) media content (e.g., media content programs, advertisements, etc.) configured to be delivered to media content processing devices by way of media content channels. Media content provider system 204 may be implemented by one or more computing devices as may serve a particular implementation.

As shown, media content provider system 204 may provide a plurality of media content streams 208 (e.g., media content streams 208-1 through 208-N), which may be received by system 100 by way of network 206 in any suitable manner. In some examples, the media content streams 208 may be provided by way of a plurality of different media content channels. An exemplary media content stream 208 will be described in more detail below.

System 100 may process the media content streams 208 in any of the ways described herein and may utilize the media content streams 208 to provide the cloud-based DVR service 202. Users (e.g., subscribers) may access the cloud-based DVR service 202 in any suitable manner. For example, users may access the cloud-based DVR service 202 by providing one or more requests to access one or more media programs included in media content streams 208. As used herein, a "media program" may include a television program, on-demand media program, pay-per-view media program, broadcast media program (e.g., broadcast television program), multicast media program (e.g., multicast television program), narrowcast media program (e.g., narrowcast video-on-demand program), IPTV media program, video, movie, audio program, radio program, and/or any other media content instance that may be presented by way of a media content processing device (e.g., a set-top box device, a television device, a computing device, etc.).

Figure 3:
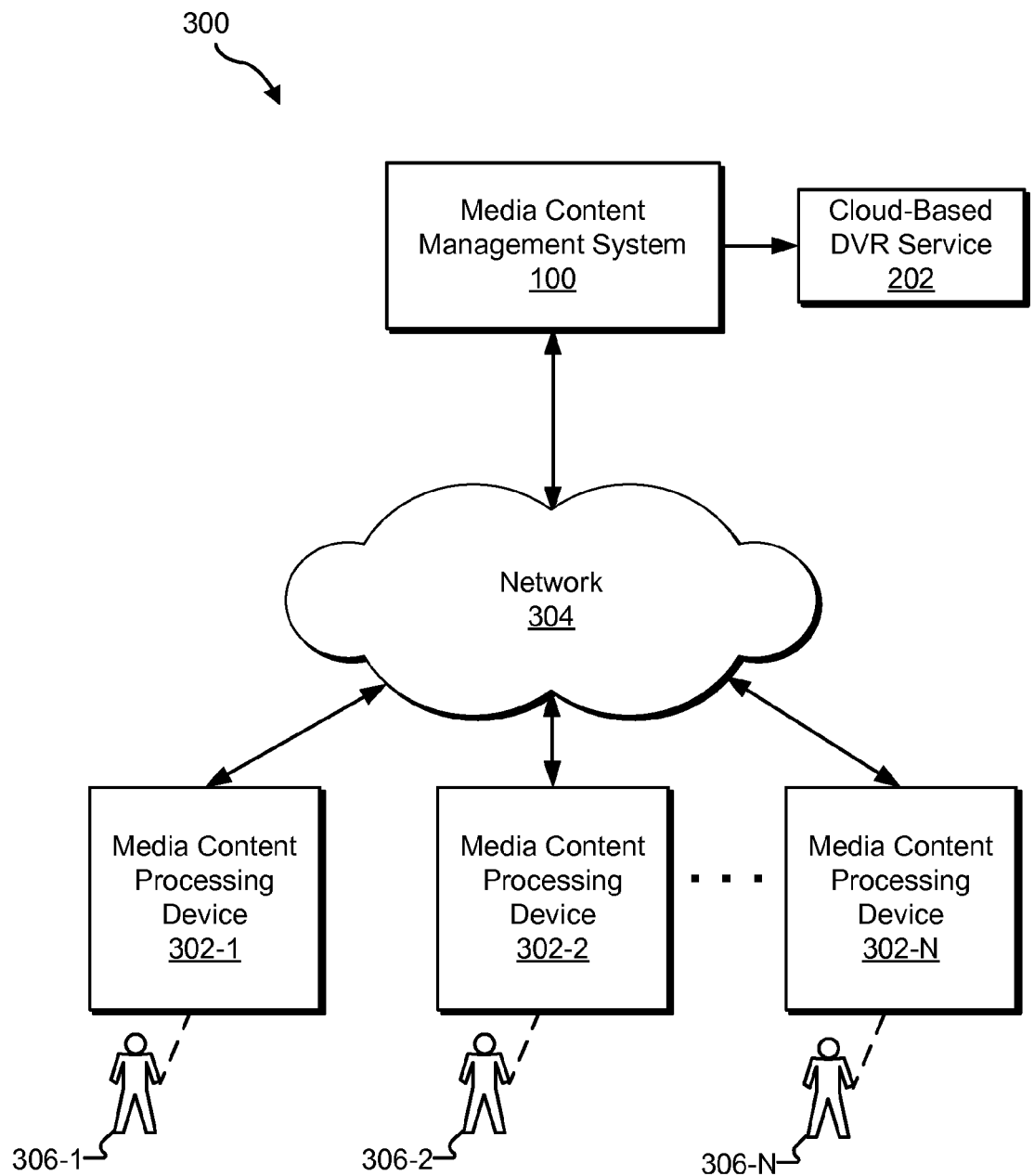
FIG. 3 shows an exemplary configuration in which users may access a cloud-based service by way of media content processing devices according to principles described herein.

To illustrate, FIG. 3 shows an exemplary configuration 300 in which users may access cloud-based DVR service 202 by way of media content processing devices. As shown, a plurality of media content processing devices 302 (e.g., media content processing devices 302-1 through 302-N) are communicatively coupled to system 100 by way of a network 304 (which may include any of the networks described herein). Each media content processing device 302 may be implemented by any device configured to process (e.g., receive, present, and/or play back) media content. For example, each media content processing device 302 may be implemented by a set-top box device, a DVR device, a television device, a gaming console, a media player computing device (e.g., a media disc player device such as a digital video disc ("DVD") or BLUERAY DISC ("BD") player device), a computer, a mobile device (e.g., a tablet computer or a smart phone device), and/or any other computing device as may serve a particular implementation.

As shown, each media content processing device 302 is associated with (e.g., used by) a user 306 (e.g., users 306-1 through 306-N). Each user 306 may provide system 100 with a request to access media content recorded and maintained by system 100 in any suitable manner. In response to such a request, system 100 may provide the user 306 with access to the requested media content by way of one or more of the media content processing devices 302. For example, user 306-1 may provide a request to play back a media program recorded and maintained by system 100 in accordance with the cloud-based DVR service 202. In response, system 100 may provide (e.g., stream) one or more media content blocks associated with (i.e., including) the media program to media content processing device 302-1. Media content processing device 302-1 may use the one or more media content blocks to play back the media program (and, in some cases, one or more advertisement breaks associated with the media program).

Returning to FIG. 1, system 100 may include various components that facilitate management of a media content stream provided by media content provider system 204. To this end, system 100 may include, without limitation, a processing facility 102 and a storage facility 104. Facilities 102 and 104 may be communicatively coupled to one another by any suitable communication technologies.

It will be recognized that although facilities 102 and 104 are shown to be separate facilities in FIG. 1, facilities 102 and 104 may be combined into a single facility or split into additional facilities as may serve a particular implementation. Additionally or alternatively, one or more of the facilities 102 and 104 may be omitted from and external to media content management system 100 in other implementations. For example, storage facility 104 may be external of and communicatively coupled to system 100 in certain alternative implementations. Facilities 102 and 104 may include or be otherwise implemented by one or more computing devices configured to perform one or more of the operations described herein. In such implementations, system 100 may be referred to as a computer-implemented system 100.

Storage facility 104 may be configured to store processing data 106 (e.g., data generated and/or used by processing facility 102) and media content data 108 (e.g., data representative of recorded media content). Storage facility 104 may maintain additional or alternative data as may serve a particular implementation.

Processing facility 102 may perform one or more processing operations with respect to a media content stream provided by a media content provider system (e.g., media content provider system 204). For example, processing facility 102 may receive a media content stream, as described above in connection with FIG. 2.

Figure 4:
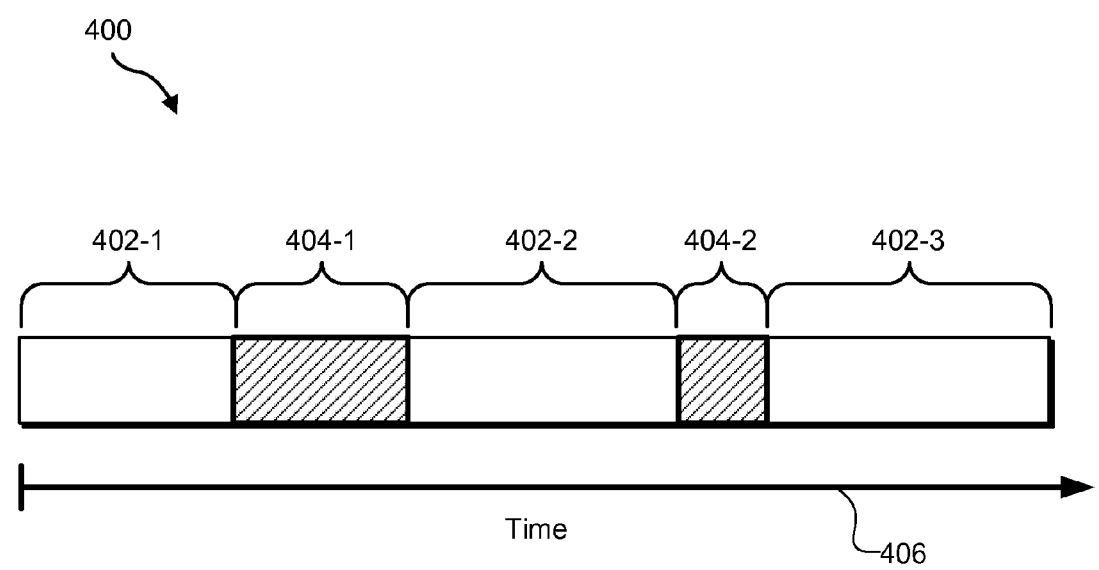
FIG. 4 illustrates an exemplary media content stream according to principles described herein.

FIG. 4 illustrates an exemplary media content stream 400 that may be received by processing facility 102. As shown, media content stream 400 may include a plurality of media program segments 402 (e.g., media program segments 402-1 through 402-3) and a plurality of advertisement breaks 404 (e.g., advertisement breaks 404-1 and 404-2) temporally arranged along a time axis 406, which may be representative of a temporal order in which the various media program segments 402 and advertisement breaks 404 are provided for presentation.

Media program segments 402 may include data (i.e., program content) representative of one or more media programs (e.g., television programs). For example, media program segment 402-1 may be representative of a first media program and media program segments 402-2 and 402-3 may be representative of a second media program.

As shown, advertisement breaks 404 may be temporally interspersed among the various media program segments 402. Advertisement breaks 404 may each include one or more individual advertisements (i.e., advertisement content) and may have distinct lengths, content requirements, and/or other attributes as may serve a particular implementation.

Each advertisement included in an advertisement break 404 may have a distinct set of attributes. For example, each advertisement may be associated with (e.g., owned by) either a content provider or a content carrier. To illustrate, a first advertisement may be associated with a content provider and may therefore include advertisement content specified by the content provider (e.g., a national advertisement). A second advertisement may be associated with a content carrier and may therefore include advertisement content specified by the content carrier (e.g., a local advertisement).

Processing facility 102 may receive a media content stream in any suitable manner. For example, with reference to media content stream 400, processing facility 102 may receive media content stream 400 by tuning to a media content channel carrying media content stream 400 and/or otherwise capturing media content stream 400. In some examples, processing facility 102 may record the media content stream as it is being received for subsequent access and playback by one or more media content processing devices (e.g., in accordance with a cloud-based DVR service).

While the media content stream is being received, processing facility 102 may detect one or more advertisement breaks included in the media content stream. For example, processing facility 102 may identify one or more timestamps (e.g., points along time axis 406) corresponding to an advertisement break (e.g., timestamps corresponding to a beginning and/or end of the advertisement break and/or one or more advertisements within the advertisement break).

To detect an advertisement break in a media content stream, processing facility 102 may process the media content stream in accordance with both a multi-stage feature detection heuristic and a signature matching heuristic. The processing may be performed independently (e.g., in parallel) as the media content stream is being received by processing facility 102. In this manner, advertisement breaks may be detected in near real-time as the media content stream is being received.

Figure 5:
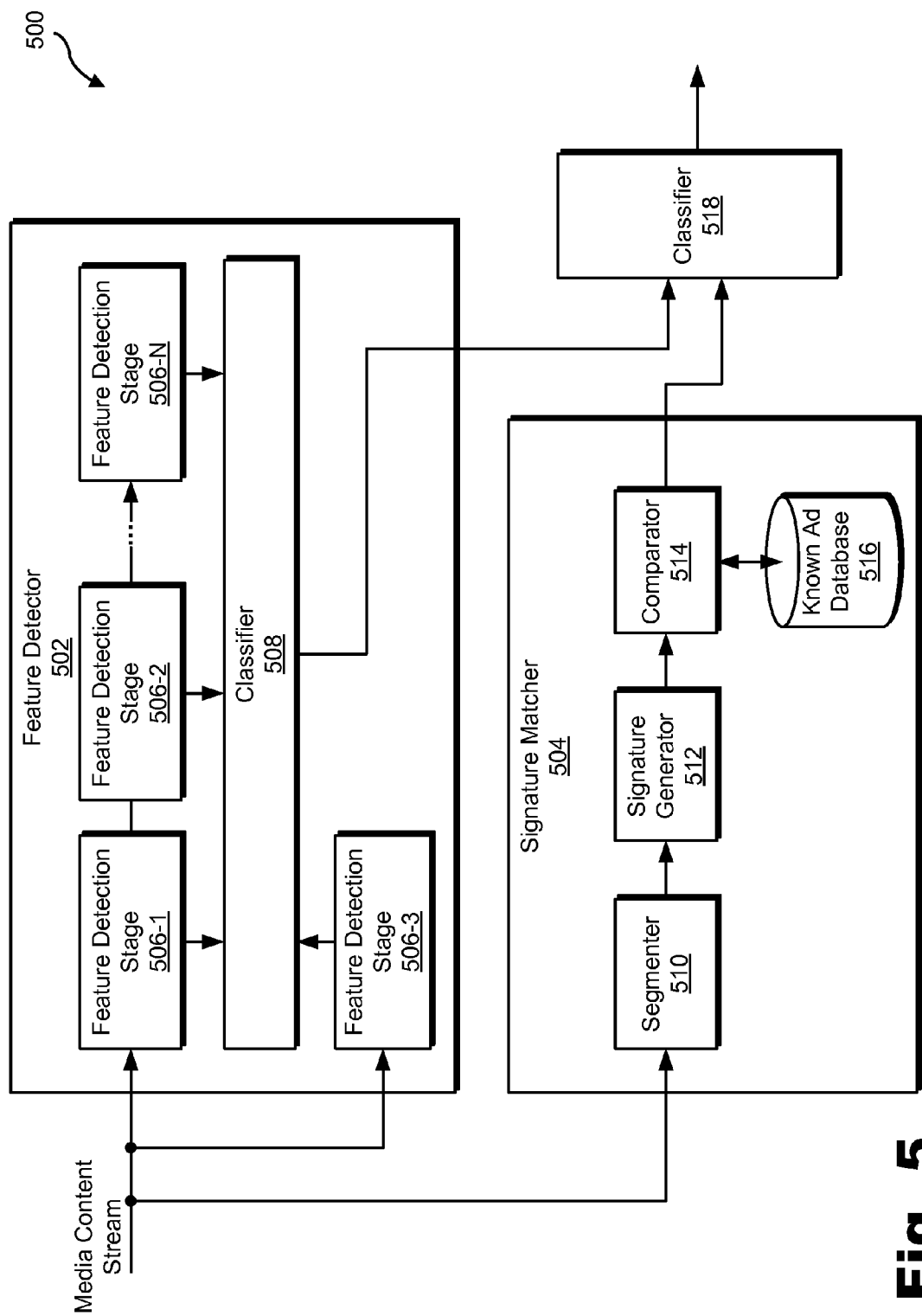
FIG. 5 shows an exemplary implementation of a processing facility according to principles described herein.

FIG. 5 shows an exemplary implementation 500 of processing facility 102 in which a media content stream is processed in accordance with a multi-stage feature detection heuristic in parallel with a signature matching heuristic. As shown, a media content stream (e.g., media content stream 400) may be input into a feature detector 502, which is configured to process the media content stream in accordance with the multi-stage feature detection heuristic. The media content stream may be independently input into a signature matcher 504, which is configured to process the media content stream in accordance with the signature matching heuristic. Feature detector 502 and signature matcher 504 may each be implemented by any suitable combination of computing devices.

Feature detector 502 may process the media content stream in accordance with a multi-stage feature detection heuristic in any suitable manner. For example, feature detector 502 may identify one or more features within the media content stream that are potentially indicative of one or more advertisement breaks within the media content stream. Based on this identification, feature detector 502 may generate a set of probability scores for a set of segments of the media content stream. Each probability score included in the set of probability scores indicates a probability that a corresponding segment included in the set of segments includes advertisement content.

To illustrate, as shown in FIG. 5, feature detector 502 may include a plurality of feature detection stages 506 (e.g., feature detection stages 506-1 through 506-N) and a classifier 508. Each feature detection stage 506 may identify one or more features within the media content stream that are potentially indicative of one or more advertisement breaks within the media content stream. Classifier 508 may use one or more of the identified features to determine a probability that a particular segment within the media content stream includes advertisement content (and hence, an advertisement break).

To illustrate, one of the feature detection stages 506 may identify caption data (e.g., closed captioning data) within the media content stream that is potentially indicative of an advertisement break. For example, the feature detection stage may parse the caption data, stem the caption data, and remove stop words from the caption data. The feature detection stage may then calculate the information gain and/or term frequency-inverse document frequency ("tf-idf") of a particular portion of the media content stream corresponding to the caption data to find regions within the portion of the media content stream that potentially include advertisement breaks.

As an example, a feature detection stage may detect the phrase "back-to-school sale" in the caption data corresponding to a particular portion of the media content stream. In response, the feature detection stage may output data representative of the phrase together with a timestamp within the media content stream that corresponds to when the phase occurs. Classifier 508 may receive the data and, based on the data (alone or together with data output by other feature detection stages), determine that a segment of the media content stream during which the phrase occurs has a relatively high probability of including advertisement content.

In some examples, one or more of feature detection stages 506 may identify one or more encoding features within the media content stream that are indicative of scene changes and/or transitions. Such encoding features may include, but are not limited to peak signal noise ratio ("PSNR"), encoding frame type, luminance, audio levels (e.g., a binned spectrogram), black frames, fade-ins, and fade-outs. These encoding features may be used by classifier 508 to determine a probability that a particular segment within the media content stream includes advertisement content.

To illustrate, a feature detection stage may identify a sequence of one or more black frames within the media content stream (which black frames may be indicative of a transition from a media program segment to an advertisement break and/or a transition from an advertisement break to a media program segment). In response, the feature detection stage may output data identifying the one or more black frames. In some examples, this data may include one or more timestamps associated with the one or more black frames. Classifier 508 may receive the data output by the feature detection stage, and, based on the data (alone or together with data output by other feature detection stages), determine that a segment of the media content stream that includes the one or more black frames has a relatively high probability of including advertisement content.

As another example, the output of one or more feature detection stages may identify a relatively long segment within the media content stream that has a relatively low scene change rate. Classifier 508 may use this output to identify the segment as having a relatively low probability of including advertisement content (i.e., the segment likely includes program content to the exclusion of advertisement content). Conversely, the output of one or more feature detection stages may identify a relatively short segment within the media content stream that has a relatively high scene change rate. Classifier 508 may use this output to identify the segment as having a relatively high probability of including advertisement content.

In some examples, one or more of feature detection stages 506 may identify one or more video-based features, such as key frames, brand and/or channel logos, text displayed within one or more frames, and/or any other video-based feature. These video-based features may additionally or alternatively be used by classifier 508 to determine a probability that a particular segment within the media content stream includes advertisement content.

To illustrate, a feature detection stage may identify (e.g., by using one or more object recognition techniques) a frame within the media content stream that includes a graphical object representative of a logo of a business entity (e.g., a restaurant). In response, the feature detection stage may output data identifying the business entity. Classifier 508 may receive the data output by the feature detection stage, and, based on the data (alone or together with data output by other feature detection stages), determine that a segment of the media content stream that includes the frame with the graphical object has a relatively high probability of including advertisement content.

In some examples, a feature detection stage 506 may analyze metadata associated with the media content stream in order to identify one or more segments that may potentially include one or more advertisement breaks. The metadata may be provided within the media content stream and/or otherwise provided (e.g., independently from a third-party provider). Classifier 508 may receive the data output by this feature detection stage 506, and, based on the data (alone or together with data output by other feature detection stages), determine a probability that the one or more segments include one or more advertisement breaks.

In some examples, feature detector 502 may subject the media content stream to a series of feature detection stages arranged in an order of decreasing computational efficiency. In this manner, each feature detection stage may exclude a portion of the media content stream from further processing by any subsequent feature detection stage by marking the portion as including program content to the exclusion of advertisement content. For example, as shown in FIG. 5, the media content stream may be first subjected to feature detection stage 506-1, which may be the most computationally efficient feature detection stage included in feature detection stages 506. Feature detection stage 506-1 (or classifier 508) may mark a portion of the media content stream as not including advertisement content (i.e., only including program content).

The media content stream may be subsequently processed by feature detection stage 506-2, which may be less computationally efficient than feature detection stage 506-1. However, because feature detection stage 506-1 has already marked a portion of the media content stream as not including advertisement content, feature detection stage 506-2 may ignore the marked portion and thereby conserve computational resources. This cascading approach may continue until any remaining unmarked portions of the media content stream are processed by feature detection stage 506-N, which is the most computationally inefficient feature detection stage out of all of the feature detection stages 506. In this manner, computational resources and time may be conserved.

To illustrate, feature detection stage 506-1 may process caption data, as described above. A subsequent feature detection stage (e.g., feature detection stage 506-2) may identify encoding features, as described above. Finally, another subsequent feature detection stage (e.g., feature detection stage 506-N) may identify video-based features, as described above.

In some examples, two or more feature detection stages 506 may be performed in parallel. For example, FIG. 5 shows that feature detection stage 506-1 and feature detection stage 506-3 are performed in parallel. The parallel feature detection stages 506 may process the media content stream in any suitable manner. For example, feature detection stage 506-1 may process caption data and feature detection stage 506-3 may identify encoding features, as described above.

In some examples, a feature detection stage may exclude a portion of the media content stream from further processing by any subsequent feature detection stage by marking the portion as including only advertisement content. For example, feature detection stage 506-1 may identify one or features that are used by classifier 508 to determine that a particular segment of the media content stream has a one-hundred percent probability of including only advertisement content. Hence, it may not be necessary for subsequent feature detection stages 506 to process the particular segment of the media content stream. In this case, classifier 508 may mark the segment as including only advertisement content so that subsequent feature detection stages 506 ignore the segment.

In some examples, the output of each feature detection stage 506 includes one or more timestamps associated with each of the detected features. In this manner, classifier 508 may dynamically maintain data representative of one or more timestamps within the media content stream that are associated with the one or more features detected by feature detection stages 506. The timestamp data may be ultimately used by processing facility 102 to classify one or more media content blocks as including one or more advertisement breaks.

As mentioned, classifier 508 may receive data representative of the features identified by each feature detection stage 506 and generate, based on the received data, a set of probability scores for a set of segments of the media content stream. Each probability score indicates a probability that a corresponding segment included in the set of segments includes advertisement content and may be represented in any suitable format (e.g., in the form of a percentage, a number within a predetermined range of numbers, etc.). Classifier 508 may generate the probability scores in any suitable manner. For example, classifier 508 may process the data representative of the identified features in accordance with business logic (i.e., a rule set) specified by a provider of system 100 and/or any other entity. The business logic may specify a relative weight for each particular feature detected by the feature detection stages 506. The weights may be processed in accordance with any suitable statistical model to determine a particular probability score for a particular segment of the media content stream.

In some examples, classifier 508 may determine a probability score for a particular segment based on features detected by multiple feature detection stages 506. For example, feature detection stage 506-1 may identify caption data that is potentially indicative of an advertisement break. Feature detection stage 506-2 may identify an encoding feature that is also indicative of an advertisement break. Classifier 508 may analyze the timestamps associated with each of these two features, and generate a relatively high probability score for the particular segment if the two timestamps are within a predetermined temporal distance of each other.

To facilitate generation of the probability scores, classifier 508 may divide the media content stream into a set of segments. The size of each segment included in the set of segments may vary. In some examples, the size of each segment included in the set of segments may be determined based on the features identified by feature detection stages 506. As an illustration, a particular portion of the media content stream that has been marked as including program content to the exclusion of advertisement content may be specified as a single segment included in the set of segments. This segment may be relatively long (i.e., correspond to a relatively long amount of time). In contrast, another portion of the media content stream that has been marked as including only advertisement content may also be specified as a single segment included in the set of segments. This segment may be relatively short (i.e., correspond to a relatively short amount of time).

The signature matcher 504 shown in FIG. 5 will now be described. Signature matcher 504 may process the media content stream in accordance with a signature matching heuristic in any suitable manner. For example, signature matcher 504 may divide the media content stream into a set of segments, generate a plurality of signatures each corresponding to a segment included in the set of segments, determine whether each signature included in the plurality of signatures matches an advertisement included in a database of known advertisements, and generate, based on the determination, a set of probability scores for the set of segments. Each probability score included in the set of probability scores indicates a probability that a corresponding segment included in the set of segments includes advertisement content.

To illustrate, FIG. 5 shows that signature matcher 504 may include a segmenter 510, a signature generator 512, a comparator 514, and a known advertisement database 516. Each of these components will now be described.

Segmenter 510 receives the media content stream and divides the media content stream into a plurality of segments. This may be performed in any suitable manner. Each segment may have any suitable size as may serve a particular implementation.

Signature generator 512 generates a signature for each segment output by segmenter 510. As used herein, a "signature" refers to a unique data sequence (e.g., a sequence of bits) that may be used to identify a particular segment of a media content stream. A signature may be based on audio content associated with the segment (e.g., speech extracted from the segment using automatic speech recognition), video content associated with the segment, text associated with the segment (e.g., closed captioning data associated with the segment), transcoding patterns and/or signals associated with the segment, and/or any other attribute of the segment as may serve a particular implementation. In some examples, using text data, natural language processing may be used to add more context to the segment (e.g., by way of name entity recognition, vector space modelling, latent semantic indexing, and/or topic modeling).

Comparator 514 compares each signature to advertisements included in a database 516 of known advertisements. As used herein, "known advertisements" refer to media content instances that are known to be advertisements. A media content instance may be designated as a known advertisement in any suitable manner.

Database 516 may include data representative of the known advertisements in any suitable manner. For example, database 516 may include signatures representative of the known advertisements. In some examples, as shown in FIG. 5, database 516 may be maintained by system 100 (e.g., in the form of media content data 108). Additionally or alternatively, database 516 may be maintained by an entity separate from system 100.

Comparator 514 may compare each signature generated by signature generator 512 to advertisements included in database 516 in any suitable manner. For example, comparator 514 may compare each signature to the advertisements in accordance with any suitable signature matching heuristic.

Comparator 514 may be further configured to generate a probability score for each segment output by segmenter 510. The probability score indicates a probability that the segment includes advertisement content. For example, comparator 514 may determine that a signature for a particular segment matches an advertisement included in database 516. Comparator 514 may accordingly generate a relatively high probability score (e.g., a probability score of one-hundred percent) for the segment, thereby indicating that the segment includes advertisement content.

As shown, the output of classifier 508 included in feature detector 502 (i.e., the set of probability scores output by classifier 508) and the output of comparator 514 of signature matcher 504 (i.e., the set of probability scores output by comparator 514) are both input into a classifier 518. Classifier 518 may use these outputs to classify a media content block included in the media content stream as including or not including an advertisement break. As used herein, a "media content block" refers to a chunk of the media content stream. As will be described below, system 100 may provide a media content stream to a media content processing device for playback by transmitting the media content stream as a plurality of media content blocks.

Classifier 518 may use the outputs of classifier 508 and comparator 514 to classify a media content block included in the media content stream as including or not including an advertisement break in any suitable manner. For example, classifier 508 of feature detector 502 may output a first probability score that indicates a probability that a first segment of the media content stream includes advertisement content. Likewise, comparator 514 of signature matcher 504 may output a second probability score that indicates a probability that a second segment of the media content stream includes advertisement content. Classifier 518 may use the first and second probability scores to classify a particular media content block as including or not including an advertisement break.

In some examples, the first and second segments referred to in the previous example each include at least some content included in the media content block. For example, the first and second segments may at least partially temporally overlap one with another. Alternatively, the first and second segments do not temporally overlap.

In some examples, classifier 518 may process the probability scores output by classifier 508 and comparator 514 in accordance with business logic (e.g., a set of rules) specified by a provider of system 100 and/or any other entity as may serve a particular implementation. The business logic may specify an average duration of an advertisement break, one or more presentation patterns or programming structures typically used by one or more media content providers (i.e., when the one or more media content providers are likely to present advertisement breaks), a schedule provided by a media content provider and representative of when one or more advertisement breaks are scheduled to be presented, one or more contextual rules (e.g., how a probability score for a particular segment may interact with probability scores for segments that do not temporally overlap with the segment, how a classification of a particular media content block affects a classification of an adjacent media content block), etc.

To illustrate, classifier 518 may classify a first media content block as including an advertisement break. In so doing, classifier 518 may determine that the advertisement break begins thirty seconds before the end of the media content block. In classifying a second media content block that sequentially follows the first media content block, classifier 518 may process one or more probability scores output by feature detector 502 and signature matcher 504 while taking into account that an average advertisement break is longer than thirty seconds (e.g., two minutes long). Based on this business logic, classifier 518 may classify the second media content block as also including an advertisement break unless the probability scores processed by classifier 518 strongly indicate that the second media content block includes only program content to the exclusion of advertisement content.

As another example, classifier 518 may take into account a programming structure used by a media content provider in determining whether a media content block includes an advertisement break. The programming structure may be determined and/or acquired in any suitable manner. For example, system 100 may analyze a media content stream provided by a media content provider for a predetermined amount of time (e.g., a few days). Based on the analysis, system 100 may identify a programming structure used by the media content provider. In other words, system 100 may determine when the media content provider is likely to present advertisement breaks during a presentation of a media program. To illustrate, system 100 may determine that the media content provider is likely to present advertisement breaks towards the end of a time block during which a media content program is presented (e.g., during the last two to three minutes of the time block). Classifier 518 may take this programming structure into account when determining whether a media content block includes an advertisement break.

In some examples, classifier 518 may classify a particular media content block by updating a "state" of the media content block as being in an "advertisement state" (i.e., the media content block is more likely than not to include an advertisement break) or in a "non-advertisement state" (i.e., the media content block is more likely than not to not include an advertisement break). In this manner, the state of the media content block may be dynamically updated as more probability scores are received and processed by classifier 518. In some examples, classifier 518 may use a state transition system model (e.g., a hidden Markov model ("HMM") to determine whether a particular media content block is in an advertisement state or a non-advertisement state. The state transition model may infer the context for a particular media content block from previous media content blocks.

In response to and/or in conjunction with classifying a media content block as including an advertisement break, classifier 518 may update an index associated with the media content stream to include data representative of at least one timestamp within the media content block that corresponds to a beginning and/or end of the advertisement break. The index may be in the form of an index file, metadata, and/or any other data structure and may be maintained by system 100 in any suitable manner. The index may be used by processing facility 102 to apply one or more playback policies to the media content stream.

To illustrate, the media content block may be included in a portion of the media content stream that includes a media program. Processing facility 102 may detect a request provided by a user to play back the media program by way of a media content processing device. In response, processing facility 102 may provide the media content block (as well as other media content blocks that represent the media program) to the media content processing device and use the index to enforce a playback policy associated with the advertisement break during the playback of the media program by way of the media content processing device. For example, processing facility 102 may use the index to identify a start and stop time of the advertisement break and apply the playback policy to the media content block during the advertisement break.

As used herein, a "playback policy" refers to a set of one or more rules that governs a playback of a particular portion of a media content stream (e.g., an advertisement break included in the media content stream). As an example, a particular playback policy may prevent a user from skipping or fast forwarding through an advertisement break and/or one or more advertisements included in the advertisement break. Another playback policy may prevent a user from fast forwarding through an advertisement break until a predetermined portion of the advertisement break (e.g., the first ten seconds of the advertisement break) is presented. Another playback policy may only allow certain users (e.g., premium service subscribers) to skip and/or fast forward though an advertisement break. Additional or alternative playback policies may be applied as may serve a particular implementation.

In addition to identifying an advertisement break within a particular media content block, processing facility 102 may also identify one or more individual advertisements within the advertisement break. To do so, processing facility 102 may utilize any of the processing heuristics described herein.

Figure 6:
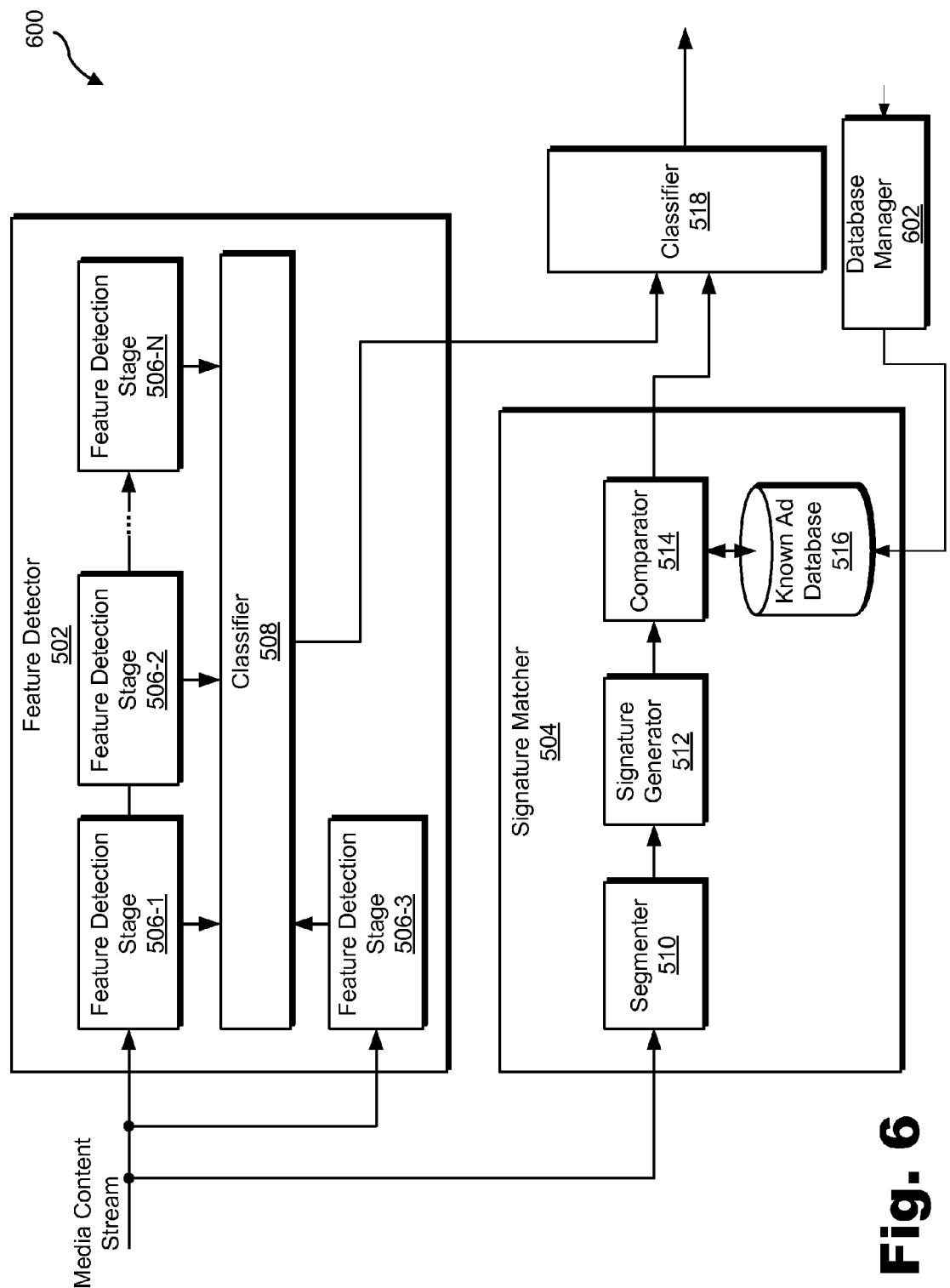
FIG. 6 shows another exemplary implementation of a processing facility according to principles described herein.

In some examples, processing facility 102 may employ a feedback loop in order to adapt and evolve as new advertisements emerge. For example, FIG. 6 shows another exemplary implementation 600 of processing facility 102 that includes a feedback loop configured to dynamically update the known advertisement database 516 as new advertisements are identified by processing facility 102. Implementation 600 is similar to implementation 500, except that implementation 600 also includes a database manager 602 employed in a feedback loop configuration between classifier 518 and signature matcher 504. Database manager 602 may dynamically update known advertisement database 516 with advertisements detected by processing facility 102. In some examples, database manager 602 may also automatically add relevant metadata associated with a detected advertisement to the advertisement database 516. Such metadata may include a description of the advertisement (which may be based on text extracted from caption data and/or generated by way of automatic speech recognition), descriptors of the advertisement (e.g., colors included in the advertisement, a mood of the advertisement, graphical objects present within the advertisement, etc.).

To illustrate, database manager 602 may identify a particular advertisement detected by classifier 518 as not already being included in database 516. In response, database manager 602 may add the advertisement to database 516. This may be done in any suitable manner. In some examples, the advertisement is not added to database 516 until the advertisement is detected multiple times (e.g., more than a predetermined minimum threshold).

Figure 7:
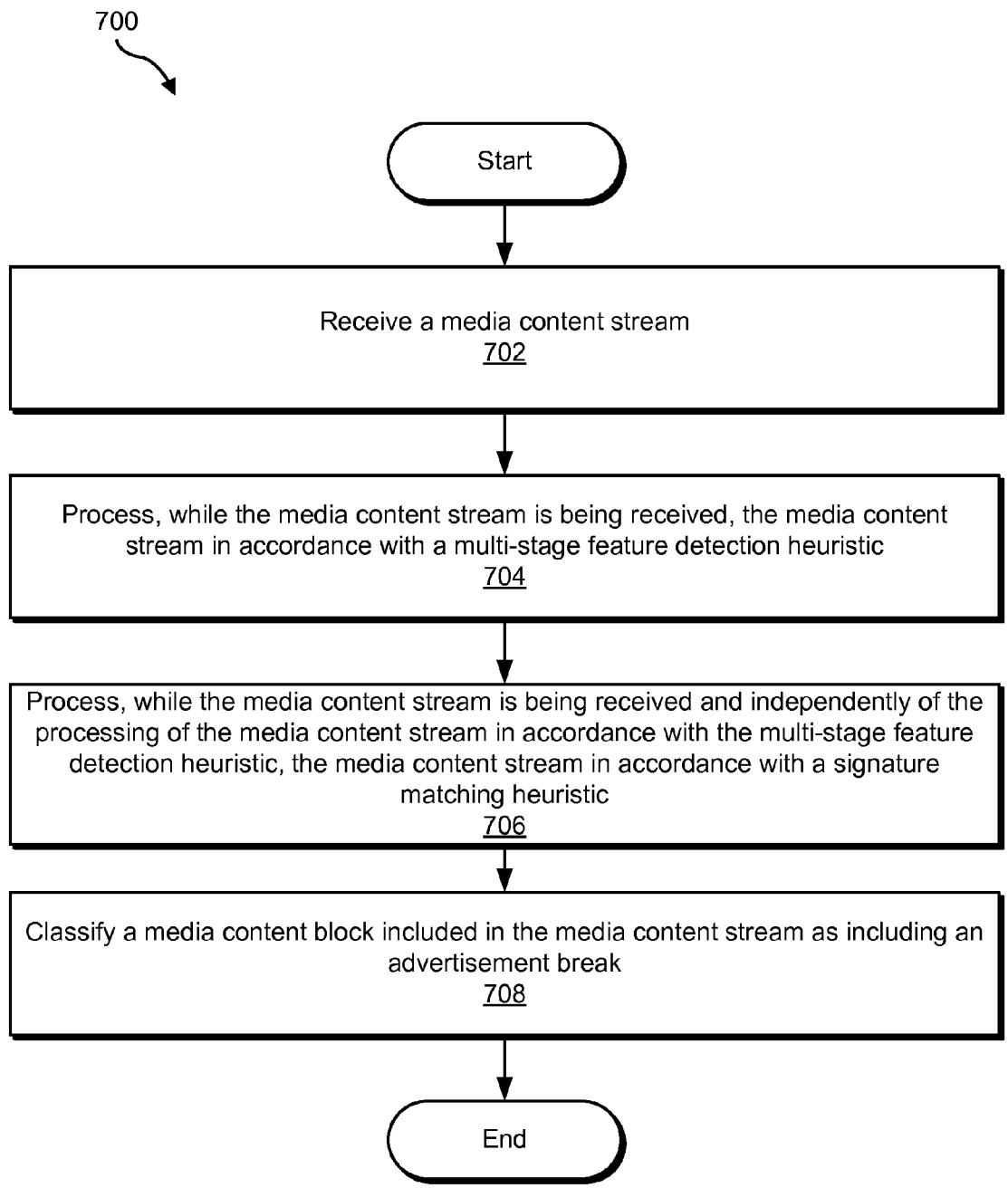
FIG. 7 illustrates an exemplary method according to principles described herein.

FIG. 7 illustrates an exemplary method 700 of detecting one or more advertisement breaks in a media content stream. While FIG. 7 illustrates exemplary steps according to one embodiment, other embodiments may omit, add to, reorder, and/or modify any of the steps shown in FIG. 7. One or more of the steps shown in FIG. 7 may be performed by system 100 and/or any implementation thereof.

In step 702, a media content management system receives a media content stream. Step 702 may be performed in any of the ways described herein.

In step 704, the media content management system processes, while the media content stream is being received, the media content stream in accordance with a multi-stage feature detection heuristic. This may be performed in any of the ways described herein. For example, the media content management system may identify one or more features within the media content stream that are potentially indicative of one or more advertisement breaks within the media content stream, and generate, based on the identification, a first set of probability scores for a first set of segments of the media content stream. The first set of probability scores indicate a probability that each segment included in the first set of segments includes advertisement content.

In step 706, the media content management system processes, while the media content stream is being received and independently of the processing performed in step 704, the media content stream in accordance with a signature matching heuristic. This may be performed in any of the ways described herein. For example, the media content management system may divide the media content stream into a second set of segments, generate a plurality of signatures each corresponding to a segment included in the second set of segments, determine whether each signature included in the plurality of signatures matches an advertisement included in a database of known advertisements, and generate, based on the determination, a second set of probability scores for the second set of segments, the second set of probability scores indicating a probability that each segment included in the second set of segments includes advertisement content.

In step 708, the media content management system classifies a media content block included in the media content stream as including an advertisement break. The classification may be based, for example, on at least one probability score included in the first set of probability scores and on at least one probability score included in the second set of probability scores.

Figure 8:
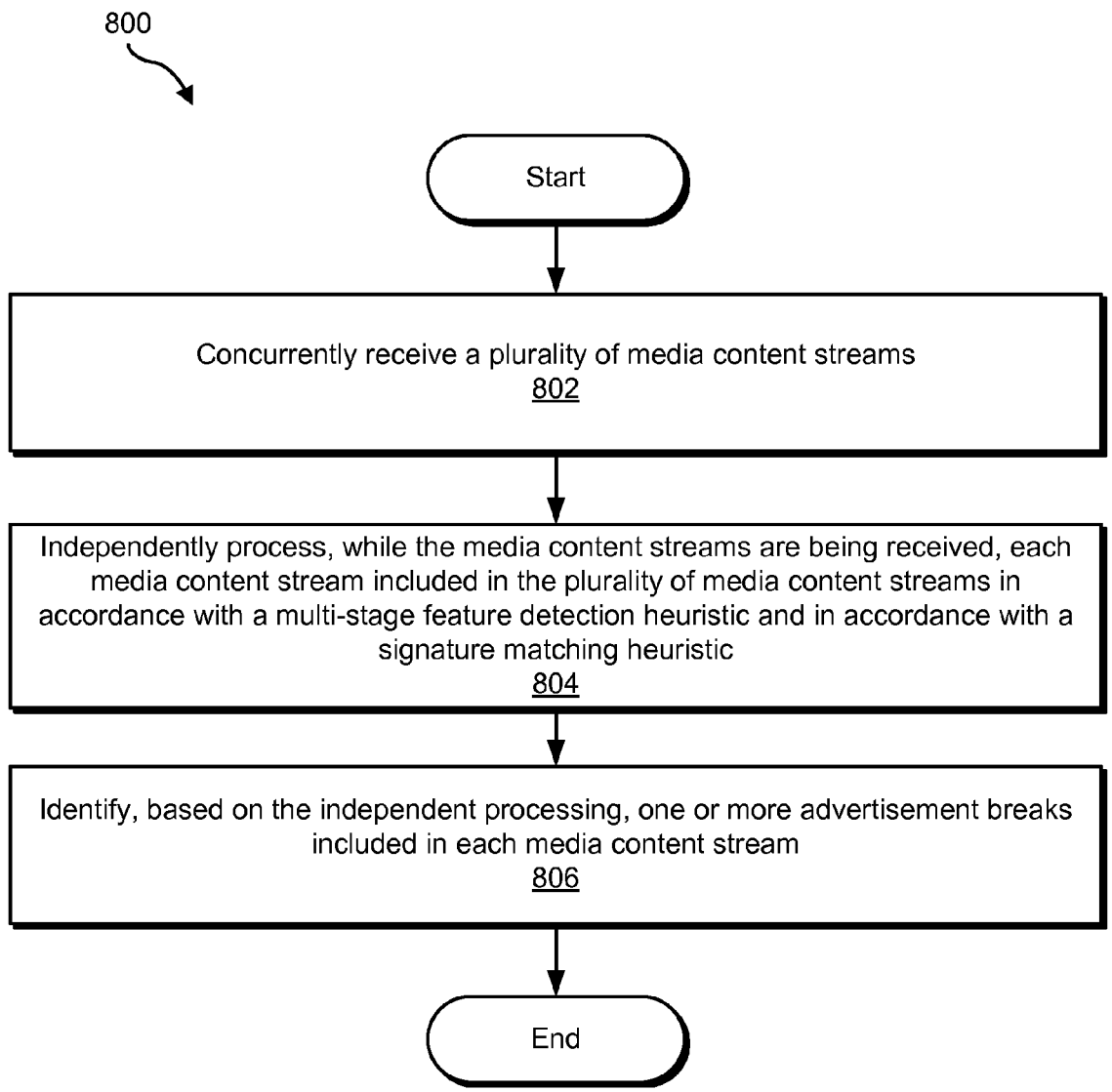
FIG. 8 illustrates another exemplary method according to principles described herein.

FIG. 8 illustrates another exemplary method 800. While FIG. 8 illustrates exemplary steps according to one embodiment, other embodiments may omit, add to, reorder, and/or modify any of the steps shown in FIG. 8. One or more of the steps shown in FIG. 8 may be performed by system 100 and/or any implementation thereof.

In step 802, a media content management system concurrently receives a plurality of media content streams. Step 802 may be performed in any of the ways described herein.

In step 804, the media content management system independently processes, while the media content streams are being received, each media content stream included in the plurality of media content streams in accordance with a multi-stage feature detection heuristic and in accordance with a signature matching heuristic. Step 804 may be performed in any of the ways described herein.

In step 806, the media content management system identifies, based on the independent processing in step 804, one or more advertisement breaks included in each media content stream. Step 806 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
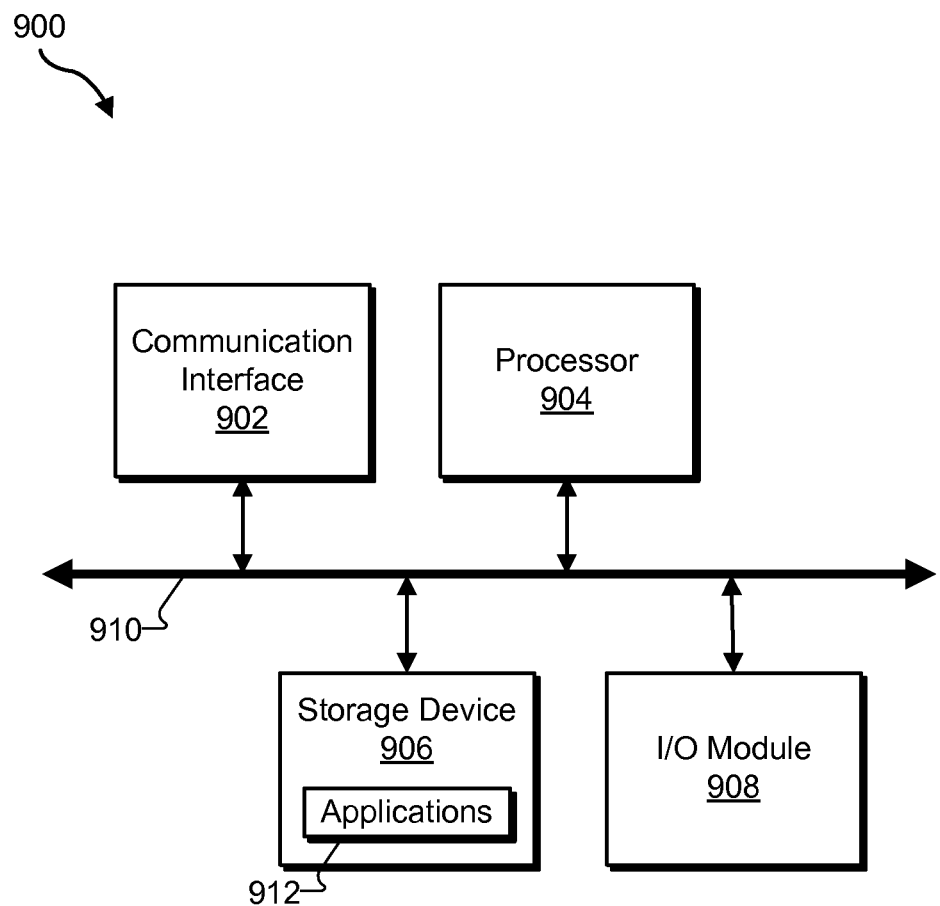
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processing facility 102. Likewise, storage facility 104 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

receiving, by a media content management system, a media content stream;

processing, by the media content management system while the media content stream is being received, the media content stream in accordance with a multi-stage feature detection heuristic by identifying one or more features within the media content stream that are potentially indicative of one or more advertisement breaks within the media content stream, and generating, based on the identifying, a first set of probability scores for a first set of segments of the media content stream, the first set of probability scores indicating a probability that each segment included in the first set of segments includes advertisement content;

processing, by the media content management system while the media content stream is being received and independently of the processing of the media content stream in accordance with the multi-stage feature detection heuristic, the media content stream in accordance with a signature matching heuristic by
dividing the media content stream into a second set of segments,
generating a plurality of signatures each corresponding to a segment included in the second set of segments,
determining whether each signature included in the plurality of signatures matches an advertisement included in a database of known advertisements, and
generating, based on the determining, a second set of probability scores for the second set of segments, the second set of probability scores indicating a probability that each segment included in the second set of segments includes advertisement content; and
classifying, by the media content management system based on at least one probability score included in the first set of probability scores and on at least one probability score included in the second set of probability scores, a media content block included in the media content stream as including an advertisement break.

2. The method of claim 1, further comprising updating, by the media content management system in response to the classifying, an index associated with the media content stream to include data representative of at least one timestamp within the media content block that corresponds to at least one of a beginning of the advertisement break and an end of the advertisement break.

3. The method of claim 2, wherein the media content block is included in a portion of the media content stream that includes a media program, and wherein the method further comprises:
detecting, by the media content management system, a request to play back the media program by way of a media content processing device;
providing, by the media content management system in response to the request, the media content block to the media content processing device; and
using, by the media content management system, the index to enforce a playback policy associated with the advertisement break during the playback of the media program by way of the media content processing device.

4. The method of claim 1, wherein:
the at least one probability score included in the first set of probability scores comprises a first probability score indicating a first probability that a first segment included the first set of segments includes advertisement content;
the at least one probability score included in the second set of probability scores comprises a second probability score indicating a second probability that a second segment included the second set of segments includes advertisement content; and
the first and second segments at least partially temporally overlap one with another.

5. The method of claim 1, wherein the identifying of the one or more features within the media content stream that are potentially indicative of one or more advertisement breaks within the media content stream comprises:
subjecting the media content stream to a series of feature detection stages arranged in an order of decreasing computational efficiency;
wherein each feature detection stage excludes a portion of the media content stream from further processing by any subsequent feature detection stage by marking the portion as including program content to the exclusion of advertisement content.

6. The method of claim 1, wherein the identifying of the one or more features within the media content stream that are potentially indicative of one or more advertisement breaks within the media content stream comprises identifying at least one of a black frame, a fade-in, a fade-out, a fast changing scene, a logo, text, and caption data within the media content stream.

7. The method of claim 1, wherein the processing of the media content stream in accordance with the multi-stage feature detection heuristic further comprises dividing the media content stream into the first set of segments, wherein a size of each segment included in the first set of segments is determined based on the identifying of the one or more features.

8. The method of claim 1, wherein the processing of the media content stream in accordance with the multi-stage feature detection heuristic further comprises dynamically maintaining data representative of one or more timestamps within the media content stream that are associated with the one or more features.

9. The method of claim 1, further comprising identifying, by the media content management system, one or more individual advertisements within the advertisement break.

10. The method of claim 1, further comprising:
identifying, by the media content management system, an advertisement within the advertisement break;
determining, by the media content management system, that the advertisement is not included in the database of known advertisements;
adding, by the media content management system in response to the determination that the advertisement is not included in the database of known advertisements, the advertisement to the database of known advertisements.

11. The method of claim 1, wherein the classifying of the media content block as including the advertisement break is further based on business logic specified by a provider of the media content management system.

12. The method of claim 1, further comprising recording, by the media content management system, the media content stream for subsequent playback by one or more media content processing devices.

13. The method of claim 1, further comprising maintaining, by the media content management system, the database of known advertisements.

14. The method of claim 1, embodied as computer-executable instructions on at least one non-transitory computer-readable medium.

15. A system comprising:
at least one computing device that
receives a media content stream;
processes, while the media content stream is being received, the media content stream in accordance with a multi-stage feature detection heuristic by
identifying one or more features within the media content stream that are potentially indicative of one or more advertisement breaks within the media content stream, and
generating, based on the identifying, a first set of probability scores for a first set of segments of the media content stream, the first set of probability scores indicating a probability that each segment included in the first set of segments includes advertisement content,
processes, while the media content stream is being received and independently of the processing of the media content stream in accordance with the multi-stage feature detection heuristic, the media content stream in accordance with a signature matching heuristic by dividing the media content stream into a second set of segments, generating a plurality of signatures each corresponding to a segment included in the second set of segments, determining whether each signature included in the plurality of signatures matches an advertisement included in a database of known advertisements, and generating, based on the determining, a second set of probability scores for the second set of segments, the second set of probability scores indicating a probability that each segment included in the second set of segments includes advertisement content; and classifies, based on at least one probability score included in the first set of probability scores and on at least one probability score included in the second set of probability scores, a media content block included in the media content stream as including an advertisement break.

16. The system of claim 15, wherein the at least one computing device updates, in response to the classification, an index associated with the media content stream to include data representative of at least one timestamp within the media content block that corresponds to at least one of a beginning of the advertisement break and an end of the advertisement break.

17. The system of claim 16, wherein the media content block is included in a portion of the media content stream that includes a media program, and wherein the at least one computing device further:

detects a request to play back the media program by way of a media content processing device;

provides, in response to the request, the media content block to the media content processing device; and uses the index to enforce a playback policy associated with the advertisement break during the playback of the media program by way of the media content processing device.

18. The system of claim 15, wherein:

the at least one probability score included in the first set of probability scores comprises a first probability score indicating a first probability that a first segment included the first set of segments includes advertisement content;

the at least one probability score included in the second set of probability scores comprises a second probability score indicating a second probability that a second segment included the second set of segments includes advertisement content; and the first and second segments at least partially temporally overlap one with another.

19. The system of claim 15, wherein the at least one computing device identifies the one or more features within the media content stream that are potentially indicative of one or more advertisement breaks within the media content stream by:

subjecting the media content stream to a series of feature detection stages arranged in an order of decreasing computational efficiency;

wherein each feature detection stage excludes a portion of the media content stream from further processing by any subsequent feature detection stage by marking the portion as including program content to the exclusion of advertisement content.

20. The system of claim 15, wherein the at least one computing device identifies the one or more features within the media content stream that are potentially indicative of one or more advertisement breaks within the media content stream by identifying at least one of a black frame, a fade-in, a fade-out, a fast changing scene, a logo, text, and caption data within the media content stream.

* * * * *